United States Patent [19]

Lepperdinger

[11] Patent Number: 5,729,218
[45] Date of Patent: Mar. 17, 1998

[54] ENCODER

[75] Inventor: Gotthard Lepperdinger, St. Georgen, Austria

[73] Assignee: RSF Elektronik Ges.M.b.H, Tarsdorf, Austria

[21] Appl. No.: 618,695

[22] Filed: Mar. 20, 1996

[30] Foreign Application Priority Data

Mar. 23, 1995 [DE] Germany ............... 95104264.7

[51] Int. Cl.⁶ .................................................. H03M 1/22
[52] U.S. Cl. ........................................................ 341/15
[58] Field of Search ................................ 341/15, 1, 6, 7, 341/10, 11, 17

[56] References Cited

FOREIGN PATENT DOCUMENTS

| 0382706 | 8/1990 | European Pat. Off. . |
| 0387488 | 9/1990 | European Pat. Off. . |
| 2611459 | 9/1977 | Germany . |
| 0201887 | 8/1983 | Germany . |

OTHER PUBLICATIONS

Kiyoshi, Ishikawa, Positioning Device, Patent Abstracts of Japan, Publication No. JP60173614, published Jul. 9, 1985.

Ernst, A., Neuere Entwicklungen bei fotelektrischen Längenmeßgeräten, messen+prüfen/automatick Juli/Aug. 1974, 435–438.

Primary Examiner—Brian K. Young
Attorney, Agent, or Firm—Anderson Kill & Olick, P.C.

[57] ABSTRACT

An encoder for measuring a relative position between two objects and including a scale support connected with one of the objects, and a scanning unit displaceable along the scale support and connected with the other of the two objects, either directly or by a carrier, by a coupling having a first coupling part attached to the scanning unit, a second coupling part attached to the other object and a carrier, and a third ball-shaped coupling part located between the facing each other surfaces of the two coupling parts and held in a constant contact with these facing surfaces by magnetic forces.

8 Claims, 3 Drawing Sheets

ENCODER

BACKGROUND OF THE INVENTION

The present invention relates to an encoder for measuring a relative position between two objects and including a scale support connected with one of the two objects, a scanning unit for scanning a scale provided on the scale support, guide means for supporting the scanning unit for displacement along the scale support independently of displacement of the two objects relative to each other, and a rigid, in a measuring direction, coupling for flexibly connecting the scanning unit with one of another of the two objects and a carrier fixedly connected to the another of the two objects, the coupling including two parts connecting with the scanning unit and the carrier, respectively, and a ball held between the two parts.

Such encoders are particularly used in machine-tools for measuring a relative position between a tool with respect to a machined workpiece.

In encoders with a scanning unit displaceable along an auxiliary guide, which is separated from the guide along which one of the objects is displaceable, a flexible connection of the scanning unit with the respective object is absolutely necessary.

German Patent No. 2,611,459 discloses an encoder in which the scanning unit for scanning the scale of a scale support is displaceable along a guide, which is not connected with the guide along which the respective object is displaceable, with the scanning unit being flexibly connected to a carrier by a coupling rigid in the measuring direction. The first coupling part of this coupling represented by a flat surface of the scanning unit, and the second coupling part has a spherical surface which is spring-biased in a constant contact with the carrier. However, with this coupling, because of a parallel offset between scanning unit guide and the object guide and because of angular offset therebetween as a result of a mounting error, a relative displacement between the plane surface of the first coupling part and the second coupling part occurs, which results, because of friction, in the wear of the coupling parts. This wear leads to a measurement error which is not tolerated in high-precision encoders.

German publication No. 3,201,887 discloses a backlash-free coupling different from the coupling disclosed in German Patent No. 2,611,459. In the coupling of German publication No. 3,201,887, there is provided a hinge having two rotational degrees of freedom and an additional linear displacement with two translational degree of freedom, effected transverse to the measuring direction. The rotational and linear displacement is effected in succession. The linear guide can be formed of a magnetic plate and a spherical surface of another part.

European Patent No. 382,706 discloses an encoder including a scale, a scanning unit displaceable along the scale, and a backlash-free coupling connecting the scanning unit with the carrier. The coupling permits a relative adjustment in a direction transverse to the measuring direction. The two coupling parts have engaging surfaces, which are convex about axes extending substantially perpendicular to the measurement direction, with the axes intersecting one another, and the engaging surfaces contacting each other at a point. The backlash-free condition of the coupling is insured by prestressed elements, formed as magnets, and acting between the scanning unit and the carrier.

European Patent No. 387,488 discloses an encoder including a coupling, rigid in the measurement direction, which flexibly connects the scanning unit and the carrier. This coupling is formed of two flat plates attached to the scanning unit and the carrier, and a ball which is spring-biased in a constant engagement with the plates, with the ball held in a predetermined position range by a cage. Because during relative movement between the object guide and the scanning unit guide, the ball can freely roll between the two plates, no wear, resulting from friction, takes place and which can adversely affect the measurement precision.

In an article published in a magazine "Messen and Prufen/Automatik" (measurement and Testing/Automatic), July/August 1974, p.p. 435–439, a coupling, which is formed of two crossing rollers, held together by springs, is used for preventing friction. Another way of preventing friction is to use a coupling of buckling-proof wires and leaf springs.

From the following discussion of different couplings, it should be clear that a need to provide a coupling having a minimum of components existed for a long time.

Accordingly, the object of the invention is an encoder having a displaceable coupling rigid in the measurement direction and in which friction between its components and, thereby, wear is prevented.

Another object of the invention is a wear-free coupling for an encoder, which has a minimum of component parts.

SUMMARY OF THE INVENTION

These and other objects of the invention, which will become apparent hereinafter, are achieved by providing a coupling in which the first and second coupling parts have surfaces facing each other and extending substantially transverse to the measuring direction, and the ball is in a constant contact with the facing each other surfaces of the first and second coupling parts, with the ball being held between the facing each other surfaces of the first and second coupling parts by magnetic forces.

Providing a ball between the two facing each other surfaces of the two coupling parts prevents friction therebetween and, thereby, their wear. Absence of wear insures the measurement precision and reliability. Furthermore, the magnetic forces insure retaining the ball in a centering position between the two coupling parts.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
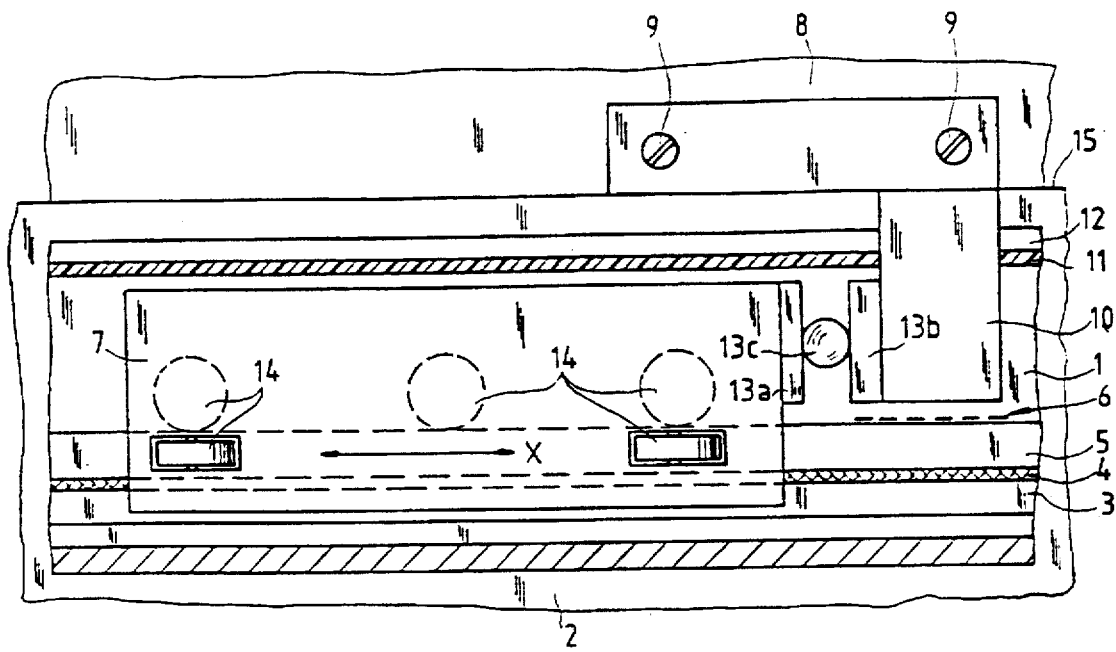
FIG. 1 shows a partially cross-sectional side view of an encoder including a coupling according to the present invention.

FIG. 1 shows a partially cross-sectional side view of an encoder the housing 1 of which is secured in any conventional manner on a slide 2 of a machine-tool (not shown). A scale support 5 is secured with a glue layer 4 on a web 3 provided in the housing 1, with the scale 6 being scanned by a scanning unit 7 in any conventional manner.

A carrier 10 is secured to the machine-tool bed with screws 9. The carrier 10 extends into the encoder housing 1 through a longitudinal slot 12 which is sealed with sealing lips 11. The portion of the carrier 10 projecting into the encoder housing 1 is connected with the scanning unit 7 by a coupling 13. The scanning unit 17 is displaced along two surfaces of the scale support 5 on rollers 14. The two surfaces of the scale support 5 form an auxiliary guide for the scanning unit 7, which is independent from a guide 15 provided on the bed 8 for the slide 2.

The slide 2 and the bed 8 represent two objects the relative position of which in a measuring direction X need be measured.

The coupling 13 includes a first coupling part formed as a first flat plate 13a attached to the scanning unit 7, and a second coupling part formed as second flat plate 13b attached to the carrier 10. The first and second plates 13a and 13b extend parallel to each other and transverse to the measuring direction X. The facing each other surfaces of the first and second plates 13a and 13b are formed of a magnetic material. A third coupling part in a form of a ball 13c is located between the two plates 13a and 13c. The ball 13c is in constant contact with the facing surfaces of the two plates 13a and 13b due to action of magnetic forces.

Figure 2:
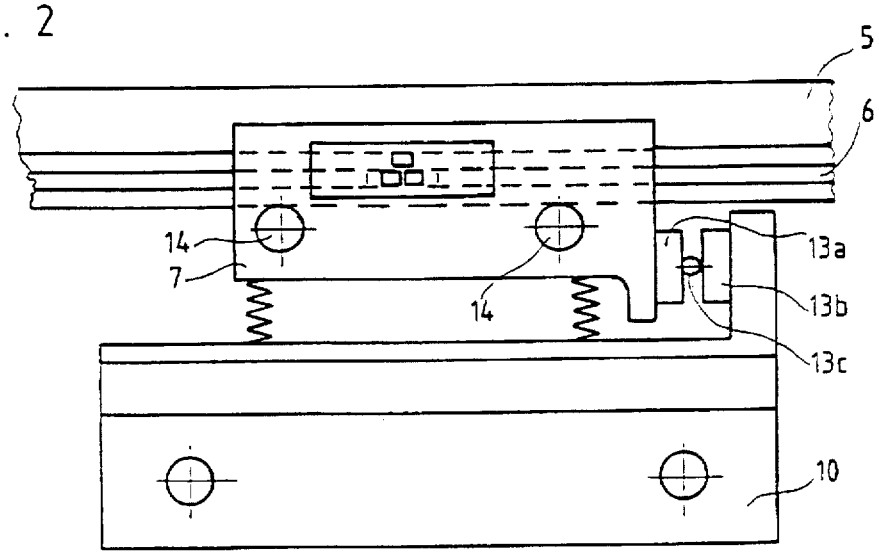
FIG. 2 shows a schematic diagram of an encoder with a coupling according to the present invention.

The schematic diagram in FIG. 2 also shows this arrangement but with some additional elements.

Figure 3:
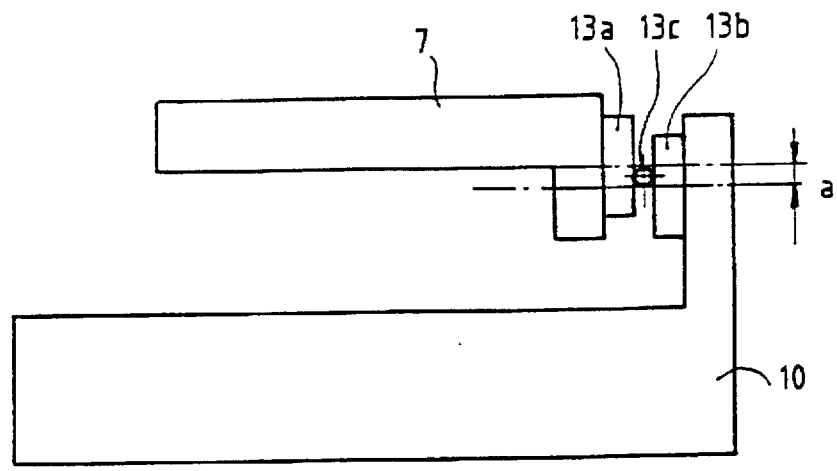
FIG. 3 shows a schematic side view of the encoder with a parallel offset of the scanning unit and the mounting block.
Figure 4:
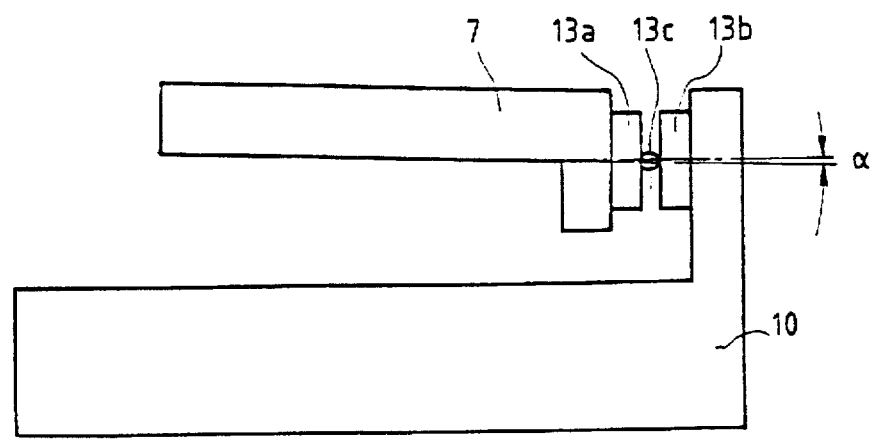
FIG. 4 shows a schematic side view of the encoder in which the scanning unit is inclined relative to the mounting block.

The ball 13c, which is likewise made of a magnetic material, is "freely" movable between the magnetic plates 14a and 13b. This means that the ball 13c, upon the displacement of the carrier 10 relative to the scanning unit 7, e.g., transverse to the measuring direction, will be rolling between the plates 13a and 13b. This relative movement is shown in FIGS. 3 and 4. FIG. 3 shows a parallel offset "a" between the scanning unit 7 and the carrier 10. FIG. 4 shows an angular offset between the scanning unit 7 and the carrier 10 by an angle α.

Figure 5:
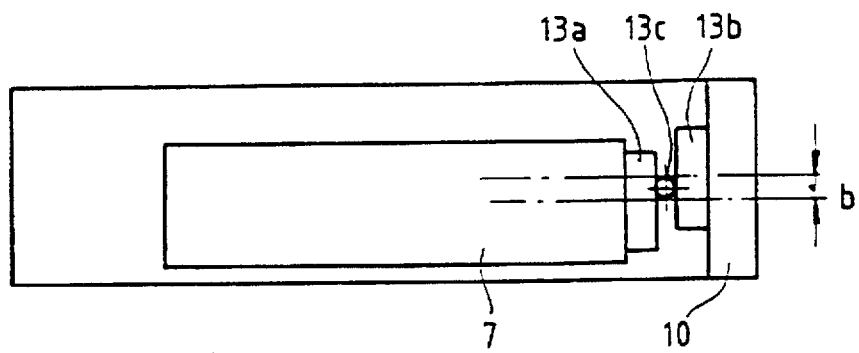
FIG. 5 shows a plan view of the arrangement where the scanning unit is parallel to and offset with respect to the mounting block.
Figure 6:
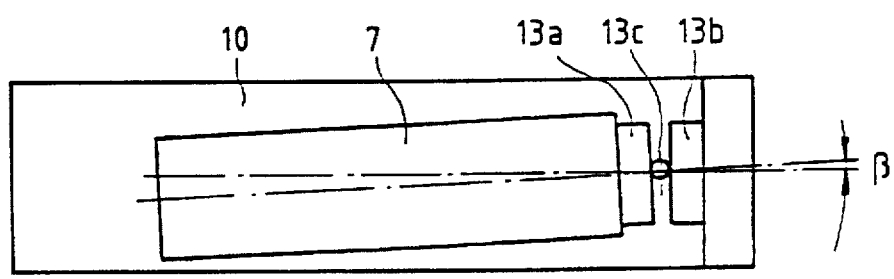
FIG. 6 shows a plan view of the arrangement where the scanning unit is inclined relative to the mounting block.

FIG. 5 shows, in a plan view, a parallel displacement of the scanning unit 7 from the carrier 10 designated as a horizontal offset "b". FIG. 6 shows tilting, in a plain view, of the scanning unit 7 relative to the carrier 10 by an angle β.

When the magnetic plates 13a and 13b are tilted relative to each other, as shown in FIGS. 4 and 6, the greater is the angular displacement between the two plates 13a and 13b, the further away is the ball 13c, which is held between the plates 13a and 13b, from its central position.

The smaller is the ball 13c the stronger it react to the angular displacement between the two plates 13a and 13b. On the other hand, the greater is the diameter of the ball 3e, the greater is the distance between the plates 13a and 13b, and the smaller is the coupling force. With a circular shape of the magnetic plates 13a and 13b, the favorable ratio between the diameter of the ball 13c and the diameter of the plates 13a and 13b will be 1:3.

With more place available, this ratio can be increased to 1:2 if thicker magnetic plates 13a and 13b are used, due to an increased magnetic force.

However, in order to keep the dimension of the ball 13c small and, and the same time, to achieve a large coupling force, it is suggested to use magnets having a large coupling force, it is suggested to use magnets having a large energy output magnets from a material such as a "noble earth" material, e.g., Samarium-Cobalt (SmCo) or Neodymium-Ferrum-Bor (NdFeB relate to this category).

Figure 7:
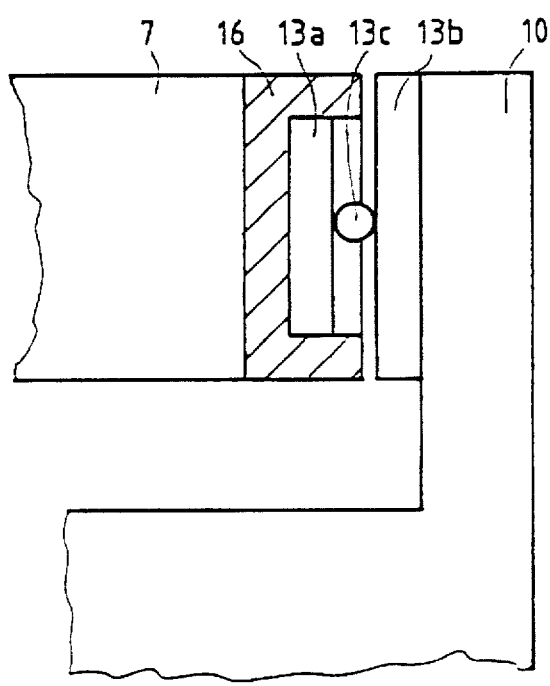
FIG. 7 shows another embodiment of an encoder coupling according to the present invention.

As shown in FIG. 7 the coupling 13 can be improved by providing an additional ferromagnetic body 16. This body 16, which is formed as a yoke, has a double function, namely, it increases the coupling force and serves, in addition, for limiting the displacement of the ball 13c at extreme accelerations to which the encoder can be subjected. The use of the ferromagnetic body 16 as a limiter is especially advantageous.

Generally, the cross-section of the magnetic plates 13a and 13b can be arbitrary selected. However, it is recommended that the plates 13a and 13b be formed as a symmetrical body, in particular circular.

The magnet plates 13a, 13b need not be flat, they may have a spherical outer surface. When the plates 13a, 13b have a spherical outer surface, it is recommended that the spherical surfaces of both plates 13a and 13b have the same radius.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An encoder for measuring a relative position between two objects, comprising:

a scale support connected with one of the two objects;

a scanning unit for scanning a scale provided on the scale support;

guide means for supporting the scanning unit for displacement along the scale support independently of displacement of the two objects relative to each other; and a coupling for rigidly connecting the scanning unit with one of another of the two objects and a carrier connected to the another of the two objects in the measuring direction and for flexibly connecting the scanning unit with the one of another of the two objects and the carrier in directions other than measuring direction;

wherein the coupling comprises a first coupling part connected with the scanning unit, a second coupling part connected with the one of another of the two objects and the carrier, and a third coupling part formed as a ball arranged between the first and second coupling parts, and wherein the first and second coupling parts have surfaces spaced from each other and extending substantially parallel to each other and substantially transverse to the measuring direction, and the ball is in constant contact with the spaced from each other surfaces of the first and second coupling parts, the ball being held between the spaced from each other surfaces of the first and second coupling parts by magnetic forces.

2. An encoder as set forth in claim 1, wherein each of the first and second coupling parts is formed as a magnetic plate, and the ball is formed of a ferromagnetic material.

3. An encoder as set forth in claim 2, wherein the ball is located in a center of the facing each other surfaces of the two plates in a rest position of the ball.

4. An encoder as set forth in claim 2, wherein the facing each other surfaces of the two plates are flat.

5. An encoder as set forth in claim 2, wherein the facing each other surfaces of the two plates are spherical.

6. An encoder as set forth in claim 2, further comprising a ferromagnetic body surrounding at least one of the plates, the ferromagnetic body forming a cage for limiting the displacement of the ball.

7. An encoder, as set forth in claim 2, wherein the facing each other surfaces of the two plates are circular.

8. An encoder as set forth in claim 7, wherein the ratio of a diameter of the ball to a diameter of the plates is from about 1:3 to 1:2.

* * * * *